Figures 1, 2:
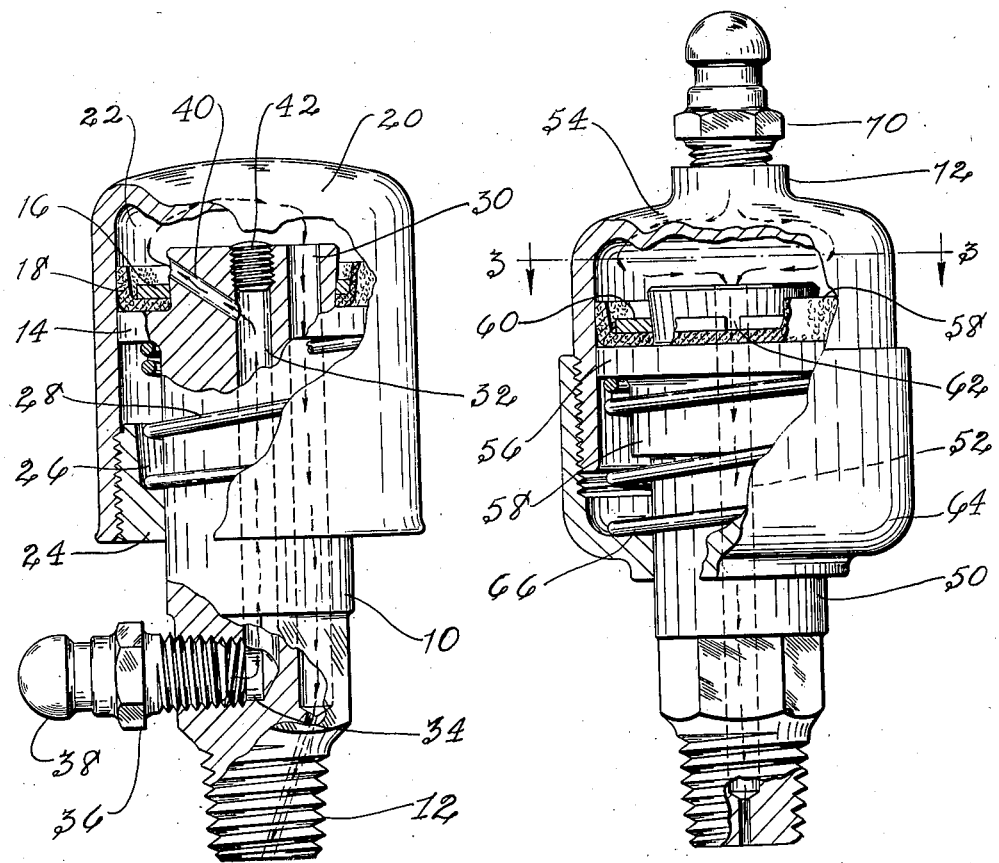

Sept. 1, 1942.  J. V. LO PRETE ET AL  2,294,673
AUTOMATIC LUBRICATOR
Filed Feb. 15, 1939

INVENTORS.
JAMES V. LoPRETE & HAROLD L. OVENSHIRE
BY
Parker & Burton
ATTORNEYS.

Patented Sept. 1, 1942

2,294,673

UNITED STATES PATENT OFFICE 2,294,673

AUTOMATIC LUBRICATOR

James V. Lo Prete and Harold L. Ovenshire, Detroit, Mich.

Application February 15, 1939, Serial No. 256,544

4 Claims. (Cl. 184—45)

This invention relates to self-feeding or automatic lubricating devices which are capable of delivering lubricant to a machine part to which they are attached for a considerable length of time, and particularly to such a device which is in the form of a fitting through which lubricant under pressure can be fed from an outside source.

An important object of this invention is to provide a strong, sturdy device of this character which is capable of receiving lubricant under high pressures and to be used in heavy duty operations on locomotives, automobile trucks and kindred types of machines. Another important object is to provide such a device which is composed of few parts, easily and economically manufactured and quickly assembled for use or dismantled for repair or cleaning. Another object of this invention is to provide a novel lubricating device through which lubricant can be fed from a high pressure gun and which will carry out any unused lubricant previously held in the device.

Essentially the invention comprises a member which is shaped at one end for attachment to the machine element to be lubricated and shaped at the other end in the form of a piston, and a second member of cup-shaped formation inverted over the piston shaped end of the other member to serve as a cylinder for the piston. The chamber formed by the two members acts as a reservoir for containing the lubricant such as grease. A passageway extending the length of the piston member and opening out through to the opposite end thereof serves as a conduit for delivering lubricant from the chamber to the part to be lubricated.

An important novel feature of this device is the provision of a relatively strong coil spring of uniform diameter which encircles the piston member and exerts a pull on the cylinder member drawing the latter down upon the head of the piston and thereby forcing lubricant through the passageway provided. Another important novel feature of the invention is the provision of means which limits the outward travel of the cylinder member against the resistance of the spring at the point when the coil spring is compressed almost to the point where the individual coils thereof commence to overlap upon one another. This novel form of assembly obtains the maximum force out of the spring without damaging or distorting the spring and thereby lengthens its life. Thus it is possible to use the stronger, less expensive form of coil springs wherein the individual coils are of uniform diameter. A further important novel feature of the invention is the use of a relatively wide, thick piston member which strengthens the whole device for heavy duty work and may as in one illustrated alternative construction of the invention have two passageways arranged side by side for the conduction of lubricant in opposite direction.

Figures 3, 4:
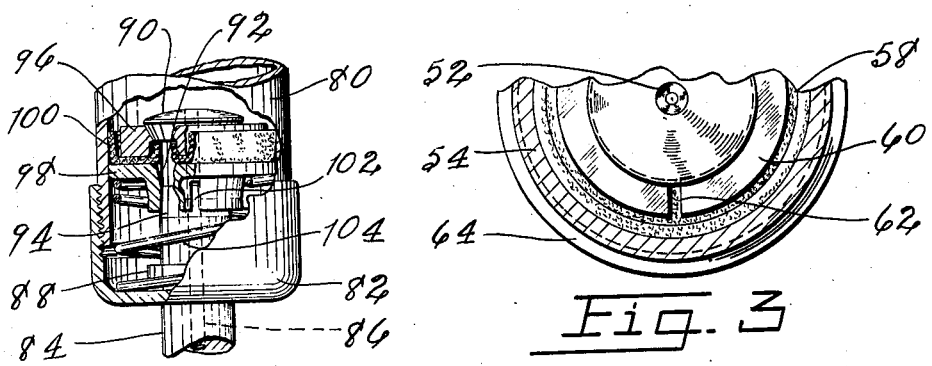

Various other objects, advantages and meritorious features will become more fully apparent from the following specification, appended claims and accompanying drawing, wherein:

Fig. 1 is a side elevation of one embodiment of the invention partially broken away to show the interior construction, Fig. 2 is a side elevation of another embodiment of the invention also partially broken away for the same purpose, Fig. 3 is a cross sectional view along line 3—3 of Fig. 2 showing assembly of piston head and, Fig. 4 is a side elevation of another embodiment of the invention partially broken away to show the inside construction.

The three embodiments of the invention illustrated in Figures 1, 2 and 4 have certain features in common. These will be particularly pointed out in connection with the description of the first modification and referred to generally in the description of the second and third modifications.

Referring specifically to the modification in Figure 1, the device comprises a body 10 of elongated circular dimensions formed of a single piece of metal stock. This body is relatively thick as shown, so thick or wide throughout the main portion of its length that two or more lubricant feeding passages can be drilled therethrough as will be pointed out more fully hereinafter. The bottom end of the body in Figure 1 is threaded at 12 to secure the device in fixed position to a machine element which is to be lubricated.

The opposite end of the body is enlarged or widened and provided with means forming this end into a piston. As shown the body is provided with a shoulder 14, a split ring 16, and a circular gasket 18 interposed between the ring and shoulder and acting in conjunction with the latter as the head of a piston. The split character of the ring is indicated at 62 in Figures 2 and 3 where a similar piston assembly is provided. Above the shoulder 14, the body tapers slightly outward as is clearly apparent. The ring has an inner diameter slightly less than that of the outward tapered extremity of the body and when snapped thereabout will hug it snugly and thus releasably lock itself and the gasket material in position.

The movable portion of the device comprises a receptacle or cup-shaped member 20 inverted over the enlarged end of the body 10, and having an inside diameter slidably fitting the cup to the shoulder 14. The cup forms in combination with the piston end of the body 10 a lubricant tight chamber 22 of varying size. In the modification illustrated in Figure 1 the cup 20 is not perforated or apertured at its closed end as in the embodiment of the invention illustrated in Figure 2. The open end of the cup member 20 extends beyond the shoulder 14. Interiorly threaded to the open end of the cup is a ring member or nut 24. This ring extends inwardly radially of the cup and slidably engages the shank of body 10 below the shoulder 14. The ring is recessed or cut away at 26 to provide a circular seat for one end of a coil spring 28.

The coil spring 28 encircles the body 10 closely and the opposite end is seated against the underside of the shoulder 14. It is readily apparent that as thus assembled the coil spring yieldingly draws the cup down on the piston end of the body 10. It is important to note that the coil spring is of uniform diameter throughout and encircles the body 10 in an annular housing formed between the body, cup, ring and shoulder 14.

The ring and spring bear a special relationship to each other which not only enables the use of a strong spring of this type but also lengthens the life of the spring. The ring extends far enough up into the cup so that when the cup is forced away from the piston end of body 10 the inner edge of the ring abuts the shoulder 14 just at the time the individual coils of the spring begin to contact one another but before they commence to overlap upon one another. This prevents distortion of the coils of the spring at the same time it limits the outward travel of the cup.

Passages are drilled longitudinally through the body 10 for the conduction of lubricant in opposite directions therethrough. As shown in Fig. 1, one passage 30 extends the length of the body opening out through the opposite ends thereof. This passage serves to conduct lubricant as the arrows indicate from the chamber 22 formed by the cup 20 to the machine element to which the end 12 of the device is secured. Another passage 32 extends from the chamber 22 to a point short of the threaded extremity 12. At this point the passage 32 communicates with a wide port 34 opening through the side of the body 10 in which is threaded a one way valving device or fitting 36 of well known design. This fitting is provided with a rounded nipple 38 to which high pressure lubricating apparatus can be attached to feed lubricant under pressure thereinto. The arrows in passage 32 indicate the direction of travel of lubricant fed into the device in this manner.

A section of the passage 30 is reduced in size in order to impose a restriction on the flow of lubricant from the chamber 22. As shown, the diameter of the passage 30 is reduced as it passes through the threaded section 12 of the body 10. This reduced section of the passage cooperates with the lubricant receiving fitting 36 by insuring that the lubricant fed under pressure to the fitting first expands and fills the chamber 22 before a substantial amount flows through passage 30 to the machine element to which the device is secured. This is of particular importance when the device is secured to a worn machine part such as a bearing having a sloppy fit. In such cases the resistance to the flow of lubricant into the working part might be less than the resistance of spring 28 and without the reduction in the size of the passage the lubricant would flow through the device without first expanding and filling the chamber 22.

Of special significance is the arrangement of the passages 30 and 32 so that the lubricant fed into the chamber 22 acts to clear the chamber of all old unused lubricant before the new lubricant enters the discharge passage 30. This is important because otherwise the old unused lubricant is likely to cake and clog the operation of the device and particularly reduce the lubricant feeding rate below that for which the parts are designed. To accomplish this, the passages 30 and 32 are arranged to open into the chamber 22 on opposite sides of the center of the piston.

As shown, passage 32 extends axially through the body 10 but one or more branch passages 40 are provided for directing the lubricant to one side of the chamber 22 and particularly through the side of the tapered extremity of the body in the circular recess formed for receiving the gasket 18 and snap ring 16. In production, the passage 32 is axially drilled out from the enlarged end of the body 10 and later the smaller passage or passages 40 are drilled into communication therewith. As readily understood in the art the opening of the passage 32 into the chamber 22 is closed in any suitable manner such as by the threaded plug 42. When more than one passage 40 is provided, they may be arranged in a radiating manner and discharge the lubricant at spaced circumferential points about one side of the enlarged end of body 10.

The embodiment of the invention illustrated in Fig. 2 is similar in several important respects to that shown in Fig. 1. It comprises a body 50 similar to body 10 but having only one passage 52 which corresponds in function to discharge passage 30 in Fig. 1. The cup-shaped member 54 is inverted over the enlarged head of the piston which is provided with a shoulder 56, gasket 58, and split snap ring 60 similar to that shown in Fig. 1. The split character of the snap ring is illustrated at 62 in this Fig. 2.

Attached to the cup 54 is a sleeve 64 equivalent to the ring 24 which in this embodiment of the invention is threaded to the outside surface of the cup. Beyond the threaded engagement of the sleeve to the cup it extends radially inwardly on all sides to form a collar slidably fitting the body 50. This collar section serves to guide the cup element in its reciprocal movement as well as form a housing for a coil spring 66 of the type described in the previous modification. As in the modification in Fig. 1, the device is constructed in a novel way to limit the outward movement of the cup and the compression of the spring when the individual coils of the latter are substantially compressed together in their plane of action but not in overlapping relationship. This is accomplished by forming an enlarged portion 68 on the body 50 which abuts the sleeve 64 when the latter travels against the resistance of the spring.

Instead of feeding lubricant into the device through the side of body 50 and conveying the same to the chamber formed by the inverted cup 54 by a passage in the body, the lubricant is fed under pressure into the device by way of a fitting 70 like that previously described but fixed in the closed end of the cup. The cup is shaped with a collar 72 which is internally threaded for this purpose. As shown by the arrows, the lubricant entering the chamber by way of the fitting spreads out as it fills the chamber and then is conducted through passage 52 to the machine part to be lubricated.

The embodiment of the invention illustrated in Fig. 4 has a cup assembly like that shown in Fig. 2 including the principal cup element 80, sleeve 82, a lubricant fitting (not shown) and a body 84 having an axially extending passage 86 connecting the chamber formed by the cup to the machine element upon the device may be secured. In several respects the assemblies of these two modifications differ. The sleeve of the modification in Fig. 4 has an upturned collar portion 88 which as is hereinafter pointed out cooperates with the piston head assembly to limit upward travel of the cup before the coils of a spring 104 are jammed together in overlapping relationship. Another novel feature of the modification in Fig. 4 is the construction and assembly of the parts composing the piston head enabling the use of a body 84 of less diameter than the two bodies hereinabove described.

As shown, the body 84 corresponding to bodies 10 and 50 in the previous modification except that it is narrower in width and lacks a shoulder element contactingly engaging the inner wall of the cup. Instead, the body 88 is provided with an outwardly flaring head portion 90, a reduced circular portion 92 connected by a tapering section 94 to the normal width of the body.

Means extending latterally of the body 84 to complete the piston head comprises a pair of ring shaped members 96 and 98 between which is disposed a flexible gasket element 100 like those previously described. The upper ring member 96 abuts the flaring side of the head 90 as shown and is wedged thereagainst. The bottom ring member 98 has a split sleeve portion 102 which is of less diameter than the tapered section 94 and yieldingly grips the same.

The coil spring 104 of uniform diameter throughout its length is seated at one end against the ring 98 and at the opposite end on the radially inwardly extending part of sleeve 82. As in the previous modifications the spring acts to draw the cup down upon the piston head. The spring also acts to compress the piston head assembly together against the head portion 90. When the cup is forced to travel in the opposite direction against the force of the spring, such as when the chamber is in the process of being filled with lubricant, the collar portion 88 of the sleeve and the split sleeve portion 102 of ring 98 abut at about the time the coils of the spring are completely compressed but before they are distorted into overlapping relationship.

The functioning of the three illustrated modifications is substantially the same. It is readily apparent that lubricant fed into the chambers of the modifications through the fittings provided for that purpose will cause the cup elements to travel upwardly against the resistance of the springs. As soon as the cup elements abut a portion of the piston head provided for that purpose, their outward travel is stopped and the capacity of the chambers restricted from further expansion. If further lubricant is introduced under pressure into the devices in this manner it will continue to enter the chambers and force a like amount through the discharge passages to the machine element to be lubricated. In each of the three modifications of the invention described herein, the pressure exerted by the incoming lubricant to force the cup elements outwardly is taken either directly or indirectly by a shoulder portion on the body elements of the devices, thus enabling large pressures to be used without any likelihood of damage to the parts.

When the lubricant pressure feeding devices are detached from the fittings, the springs in the respective modifications act to collapse or draw the cup elements down upon the piston heads and thus slowly feed lubricant from the chamber through the discharge passage to the machine part to be lubricated. The devices may be designed to fully discharge their respective chambers in this manner in twenty-four or forty-eight hours or more. At any time, the springs in the devices can be readily changed for different kinds of oils or greases.

The devices described herein are especially adaptable for heavy duty work where it is necessary to feed lubricant under high pressure into the devices and where a relatively high pressure is developed by the resilient elements of the devices to automatically feed lubricant therefrom. The devices illustrated in Figs. 1 and 2 are particularly sturdy structures, applicable for use on railroad locomotives, trucks and the like. The parts are designed for strength, ruggedness, and simplicity and are intended to withstand considerable abuse and long usage. When in use, the amount of lubricant in the chamber can be determined by the height of the cup. If desired a scale could be etched on the side of the body elements indicating by the position of the cup whether the chamber is full, half full, empty or any other intermediate stage.

What we claim is:

1. In a self-feeding lubricating device having a stem member, a cup member inserted on one end of the stem member and forming a sealed chamber therebetween for containing lubricant, spring means yieldingly acting to collapse the cup member upon the end of the stem member, said stem member provided with a passageway extending from one end to the other and adapted to conduct lubricant from the chamber to the other end of the stem and further provided with a second passageway opening at one end into said chamber and at the other end through the side of the stem member beyond the open end of said cup member when in collapsed position, and a high pressure lubricant receiving fitting secured to said stem member over the side opening of said secured passageway and having a check valve therein adapted to admit lubricant under pressure into the passageway and thence to the chamber to fill the same.

2. An automatic lubricant feeding device comprising, in combination, a relatively wide elongated body of circular dimensions having one end arranged for securement to a machine element to be lubricated and the other end shaped in the form of a piston, an imperforated inverted cup fitted over the piston end of the body and forming in combination therewith a sealed chamber for containing lubricant, spring means between the body and the cup yieldingly acting to collapse the latter on the piston of the body, said body provided with a passage extending the length thereof and opening out through the opposite ends of the body, said body also provided with a second passage extending parallel to the first passage and extending from the chamber to a point short of the opposite end of the body but beyond the open end of the cup when in collapsed position, said body further provided with a transverse port opening through the side thereof and communicating with the end of the said second passage, and a one way valving device secured to said body over said port and adapted to discharge lubricant into the same and thence by way of the second passage to the chamber but preventing any return flow of lubricant.

3. An automatic lubricant feeding device comprising, in combination, a relatively wide elongated body of circular dimensions having one end arranged for securement to a machine element to be lubricated and the other end shaped in the form of a piston, an imperforated inverted cup fitted over the piston end of the body and forming in combination therewith a sealed chamber for containing lubricant, spring means between the body and cup yieldingly acting to draw the latter down on the piston end of the body, said body provided with a passage for lubricant extending the length thereof and opening out through the opposite ends thereof, said passage adapted to conduct lubricant from said chamber to the machine element to be lubricated, said body also provided with a second passage opening out through the side of the body beyond the open end of the cup when in fully drawn down position and extending through the body and opening out into said chamber, said last passage adapted to conduct lubricant in an opposite direction to that in the other passage and feed lubricant into the chamber to fill the same, the respective openings of said passages in said chamber being arranged on opposite sides of the center of the piston head whereby when lubricant is fed into the chamber through said second passage it tends to empty the chamber of all unused lubricant before entering the first mentioned passage.

4. An automatic lubricant feeding device comprising, in combination, an inverted cup, a cylindrical member extending into said cup through the open end thereof, said member provided with a head and a tapered section adjacent to the head, a ring slidably fitted on the member from the end opposite to the headed end and positioned against the underside of the head, said ring having a maximum diameter less than the inside diameter of the cup, a second ring similarly slidably fitted on the member and having a part thereof expandable into the tapered section of the member for releasable self-locking securement thereto, gasket material interposed between said two rings and extending into contact with the inner wall surfaces of the cup, a coiled spring encircling the cylindrical member and seated at one end upon the said second mentioned ring and upon the other end on the cup-shaped member and exerting a force drawing the latter against the head of the piston.

JAMES V. LO PRETE.
HAROLD L. OVENSHIRE.